United States Patent Office 3,273,966
Patented Sept. 20, 1966

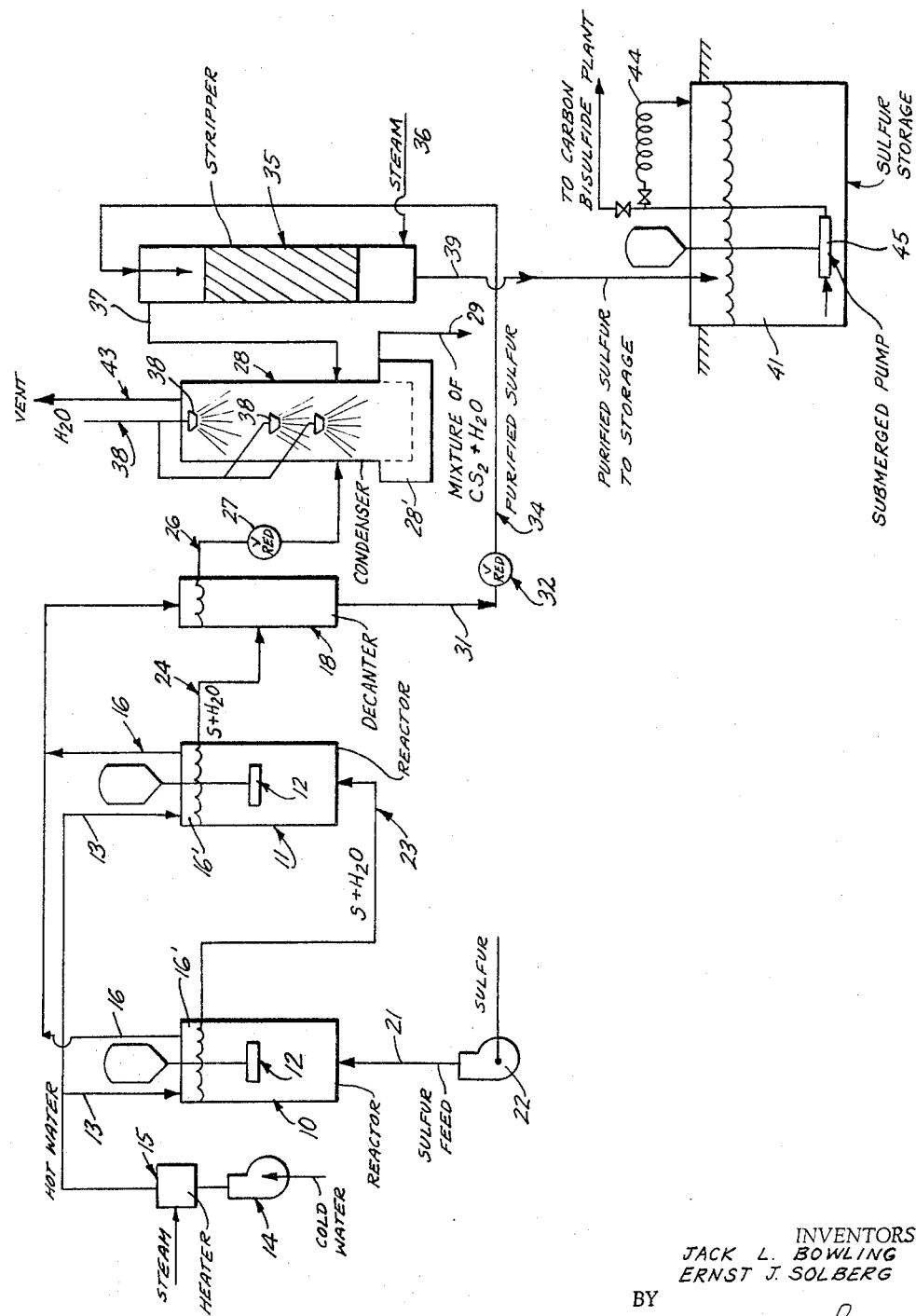

3,273,966
PURIFICATION OF SULFUR
Jack L. Bowling, St. Albans, and Ernst J. Solberg, Charleston, W. Va., assignors to FMC Corporation, New York, N.Y., a corporation of Delaware
Filed Nov. 15, 1963, Ser. No. 323,926
8 Claims. (Cl. 23—229)

This invention relates to the purification of sulfur containing impurities such as iron, carbon bisulfide, sulfur chlorides or organic chlorides.

In the manufacture of carbon tetrachloride by reacting carbon bisulfide with chlorine to form carbon tetrachloride and sulfur monochloride, and reacting the latter with carbon bisulfide to form carbon tetrachloride and sulfur, the sulfur thus produced contains impurities, usually iron, carbon bisulfide, sulfur chlorides and organic chlorides. The amounts of these impurities can vary. Generally the sulfur contains from 20 to 100 p.p.m. (parts per million) of iron, from a trace to 1.5% of carbon bisulfide, from 0.1% to 2% of organic chlorides, and from 1% to 4% of sulfur chlorides calculated as sulfur monochloride. In this specification all percentages and parts are given on a weight basis, unless otherwise indicated. In a typical commercial operation the sulfur produced as a by-product from the reaction of sulfur monochloride with carbon bisulfide to form carbon tetrachloride as the desired main product contains about 50 p.p.m. of iron, about 0.1% carbon bisulfide, about 0.4% of organic chlorides and about 2% of sulfur chlorides calculated as sulfur monochloride.

This by-product sulfur can be reacted with hydrocarbons such as methane to produce carbon bisulfide for its many industrial uses including reaction with chlorine to produce carbon tetrachloride and sulfur monochloride. Sulfur containing iron and chloride impurities, in amounts of above about 10 p.p.m. of iron and above about 0.02% of sulfur chlorides, whether obtained as a by-product as hereinabove described or from any other available source, when further processed such as in carbon bisulfide production, results in corrosion and equipment fouling at various stages of the processing of the sulfur and its reaction products. Furthermore, the by-product sulfur containing carbon bisulfide as hereinabove disclosed, when further processed in an oxidizing atmosphere or when stored under conditions permitting access of oxygen, e.g., air, to the sulfur, can result in an explosive carbon bisulfide containing gaseous mixture. Sulfur containing as little as 0.039% carbon bisulfide at 140° C. yields 1.25 volume percent carbon bisulfide in the surrounding air atmosphere; such air carbon bisulfide mixtures are explosive and will autoignite at normal sulfur storage temperatures.

Purification procedures heretofore proposed involving washing of sulfur with water, steam distillation of the sulfur and other procedures have been found unsatisfactory. For example, steam distillation of the sulfur by introducing the steam into the molten sulfur and taking off overhead the steam and volatile impurities resulted in a sulfur product containing about 0.04% sulfur chlorides calculated as sulfur monochloride and as much as 100 p.p.m. of iron. Sulfur containing such amounts of these impurities produces excessive corrosion and equipment fouling when further processed, such, for example, as in carbon bisulfide production. In general, heretofore known procedures for purifying sulfur sufficiently for further processing to carbon bisulfide are not satisfactory for one or more of the following reasons:

(a) The purification procedures give inadequate removal of iron and chlorides with consequent relatively high corrosion and fouling of equipment in the carbon bisulfide production plant;

(b) the maintenance costs of the purification equipment are high;

(c) the operating costs and capital requirements of the purification equipment are high; and (d) they involve explosion hazards due to formation of explosive carbon bisulfide containing gaseous mixtures.

It is a principal object of the present invention to provide a process for purifying sulfur containing iron and chloride impurities to effect the removal of the bulk of such impurities.

Another object of this invention is to provide a continuous process for the treatment of sulfur produced as a by-product in the manufacture of carbon tetrachloride, which sulfur contains iron, carbon bisulfide, sulfur chlorides and organic chlorides impurities to produce a purified sulfur satisfactory for carbon bisulfide production with marked minimization of corrosion and fouling of the equipment employed for such production.

Other objects and advantages of this invention will be apparent from the following detailed description thereof.

In accordance with this invention sulfur containing iron and chloride impurities, as hereinabove disclosed, in the liquid phase is mixed with hot water, the temperature of the mixture being at least about 120° C., and the mixing carried out under super-atmospheric pressure of at least about 15, preferably at least about 25 p.s.i.g., for a residence time at least long enough for reaction to take place between the water with the sulfur chlorides to form hydrochloric acid which dissolves in the water and for the aqueous hydrochloric acid thus produced to effect dissolution of iron impurities. It is important that the iron impurities be dissolved in the aqueous hydrochloric acid phase; when not dissolved they tend to remain with the sulfur.

Some water vapor along with volatile chlorides, carbon bisulfide, if present, and sulfur dioxide may be evolved during this treatment, but the bulk of the water introduced remains in the liquid phase. The carbon bisulfide thus evolved is so evolved in a non-oxidizing atmosphere and hence does not present an explosion hazard. The mixture of aqueous material and molten sulfur while maintained under pressure stratifies into two phases, an upper aqueous phase and a lower sulfur phase. The aqueous phase containing the dissolved iron impurities and hydrochloric acid are separated from the sulfur phase. After separation of the molten sulfur from the aqueous phase, the pressure is reduced on the molten sulfur; desirably the pressure is reduced to about atmospheric pressure, permitting residual water and volatile impurities to flash off.

Preferably, but not necessarily, after or simultaneously with the flash-off of water and volatile impurities, the treated sulfur is subjected to stripping with an inert gas, e.g., steam, or nitrogen, to effect substantially complete removal of residual water and volatile impurities. There is thus obtained a purified sulfur containing less than 10 p.p.m. of iron, preferably less than 5 p.p.m. of iron, no more than 0.03% carbon bisulfide, generally from a trace to 0.008% carbon bisulfide, no more than 0.02% of organic chlorides, and no more than 0.02%, generally from a trace to 0.03% of sulfur chlorides calculated as sulfur monochloride. The process of this invention in practice has produced sulfur containing from 0 to less than 5 p.p.m. of iron, from 0 to 0.02% carbon bisulfide, less than 0.01% organic chlorides, traces of water, and about 0.0025% sulfur monochloride.

The crude sulfur is fed to the reactor in the molten state, preferably at a temperature of from 200° to 220° C., its temperature when removed as a by-product from the production of carbon tetrachloride. When mixed with the hot water the temperature of the mixture is at least about 120° C. The treatment of the molten sulfur with hot water at a temperature of at least about 120° C., preferably 125° to 145° C. and under a pressure of at least 15 p.s.i.g., preferably 25 to 45 p.s.i.g., can be carried out in any suitable equipment resistant to corrosion, such, for example, as a tank or tanks, each equipped with an agitator or in suitable scrubbing tower or towers including packed columns or towers, or countercurrent extractors. The amount of water used relative to the sulfur will depend on the impurities present in the sulfur treated and the extent of purification desired. Preferably the water is mixed with the sulfur in the ratio of from 1/8 to 6 volumes of sulfur per volume of water. The amount of water used should be sufficient to provide distinct sulfur and aqueous phases when the mixture is subjected to stratification.

As noted, the contact or residence time between the sulfur and the water should be at least sufficient for the water to react with chlorides to form hydrochloric acid and for the latter to dissolve iron impurities. By residence time is meant the time each unit particle of molten sulfur is in contact with hot water under superatmospheric pressure in each treatment stage. In agitated batch treatment the residence time is the time the water and molten sulfur are agitated together in each batch reactor. In continuous equipment, the residence time in each reactor or extractor is the time each unit particle of sulfur remains in contact with water therein. The residence time depends on the temperature and pressure conditions used; whether the treatment is batch or continuous; the desired purity of the sulfur; and the equipment in which the treatment is carried out with particular reference to the manner in which intimate contact between the hot water and the molten sulfur is effected, i.e., the extent of the mixing of the water and sulfur phases and where an agitator is used the speed or efficiency thereof. In general, the contact or residence time when employing batch operation with efficient agitation of each batch, is appreciably shorter than when utilizing continuous operation. Operating batchwise the contact or residence time should be at least 10 seconds, and preferably from 10 seconds to 10 minutes. Operating continuously the contact or residence time in each reactor will depend upon the number of reactors used. Thus, employing two stages or reactors with a contact or residence time in both reactors of 260 and 520 seconds, respectively, and employing a crude sulfur containing from 1% to 4% sulfur chlorides, a sulfur product is obtained containing 0.02% and 0.01% sulfur monochloride, respectively. Employing three stages with a residence time in all three, i.e., total hold-up time of 108 seconds, employing the same crude sulfur, a purified sulfur is obtained containing 0.02% sulfur monochloride. Treating the same crude sulfur in nine stages and employing a total residence or contact time of 45 and 88 seconds, a purified sulfur is obtained containing 0.02% and 0.01% sulfur monochloride, respectively. Preferred total residence time for continuous operation involving multiple stages is at least about 40 seconds; the greater the number of stages the shorter can the residence time be in each stage, but, as noted, it is preferred to have the total residence time at least about 40 seconds. Employing two stage continuous operation, as disclosed in the drawing, the residence time should be at least about 2 minutes per stage, preferably from 10 to 25 minutes per stage.

These conditions of temperature, pressure and residence time are important to enable the reaction to take place to the desired extent between the water and the sulfur chlorides to form hydrochloric acid and further to effect dissolution of iron impurities by the aqueous medium thus produced so that iron impurities go into the hydrochloric acid aqueous phase and are separated from the sulfur when the aqueous phase is separated from the sulfur phase. This water treatment of the sulfur can be carried out in one or more stages with or without separation of the molten sulfur phase from the aqueous phase before passage of the molten sulfur from a preceding stage to a succeeding stage. It is important that before the pressure is reduced on the sulfur phase, the latter is separated from the aqueous phase because by so doing maximum removal of iron and chloride impurities from the sulfur is accomplished; moreover, excessive quantities of water, if present, in the sulfur after the pressure is reduced may cause the sulfur to solidify.

In a preferred embodiment of the invention, the crude sulfur, i.e., the sulfur to be purified, and hot water are fed continuously into a stirred reactor maintained at a temperature of at least about 125° C. and under a superatmospheric pressure of at least about 25 p.s.i.g. so that the water is maintained in the liquid phase. The sulfur and water thus introduced remain in intimate contact with each other in this reactor for at least 40 seconds, by agitation of the mixture to allow the reaction between the sulfur chlorides and water to proceed to produce hydrochloric acid, sulfur dioxide and sulfur. The hydrochloric acid thus formed produces an acid medium which effects extraction of the iron compounds from the sulfur. The water reacts with sulfur chloride to form hydrochloric acid and sulfur; water extraction thus effectively removes chlorides from the sulfur, part of the sulfur thus formed mixes with the molten sulfur subjected to purification and adds to the yield. Carbon bisulfide and organic chlorides are stripped from the reaction mixture by reaction product gases including steam formed from the water, as the purification reaction proceeds. From the reactor sulfur-water mixture is withdrawn continuously, stratified into aqueous and molten sulfur layers, the latter separated from the aqueous layer, the pressure on the molten sulfur thus separated reduced to atmospheric pressure or near atmospheric pressure, and the molten sulfur stripped with an inert gas to remove residual water and impurities, including carbon bisulfide. Where the purity requirements permit, the stripping step can be eliminated, i.e., need not be used, producing a sulfur product having small amounts of moisture, chlorides and organics.

If desired, the mixture of water and molten sulfur can be fed continuously from the first reaction stage to a second reaction stage and from the latter to a third stage, etc. Additional hot water may or may not be introduced into the stages following the first stage. In each subsequent reactor, substantially the same conditions of temperature and pressure are maintained; the residence time can vary depending chiefly on the capacity of the various reactors of the series. Further removal of impurities is thus effected in each stage.

From at least the last stage the mixture is subjected to stratification, the molten sulfur phase separated from the aqueous phase, the pressure on the molten sulfur phase reduced, and water and vapors flashed off. Preferably the molten sulfur, while at a pressure of atmospheric or near-atmospheric, is passed continuously into a distillation type column operated at a bottoms temperature of from about 125° C. to 150° C., where it is stripped with an inert gas, e.g., steam. The stripped gas is passed into a direct contact water condenser where the condensables, including carbon bisulfide, are condensed. The carbon bisulfide condensate thus produced mixes with water in the base of the condenser and this mixture is withdrawn therefrom. In this way formation of an explosive carbon bisulfide containing gaseous mixture is prevented. Purified sulfur is obtained as bottoms product from this column.

In an alternative continuous process, the molten sulfur is supplied continuously to the upper portion and the hot water supplied continuously to the lower portion of a column maintained under super-atmospheric pressure as herein disclosed. The interior of this column can either be packed or consist of one or more agitated stages. The hot water rises through the descending molten sulfur. Aqueous hydrochloric acid containing dissolved iron impurities and off-gases are removed continuously from the upper portion of this column and passed to a direct water condenser. The sulfur is removed continuously from the lower portion of this column and the pressure thereon then released; the volatiles thus flashed off are passed to the direct water condenser.

When operating batchwise, the reactor is first purged with steam or inert gases, whenever a flammable gas ($CS_2$) hazard exists. The molten sulfur is then charged into the reactor without agitating the charge. The reactor is then pressurized with steam to operating pressure and superheated liquid water, at a temperature of about 120° C. or higher, is introduced forming a layer of water on the molten sulfur. If desired, the charge may be agitated during the addition of the water. During the agitation, off-gases are vented from the reactor, preferably to a direct contact water condenser, giving safe handling of the carbon bisulfide. When the mixture of sulfur and water has been agitated for the required time interval, which as noted should be at least 10 seconds, the agitation is stopped and the sulfur allowed to settle. The sulfur is then drained from the reactor and the pressure released to permit volatiles to flash-off; these volatiles are passed into the direct contact water condenser. Preferably the sulfur is thereafter stripped with an inert gas such as steam to remove residual volatile impurities. After the sulfur has been drained from the reactor, the water layer is removed therefrom.

The accompanying drawing is a flow sheet showing a preferred arrangement of equipment for practicing the process of this invention. This flow sheet shows, for illustrative purposes and in order to exemplify a preferred embodiment of the equipment required for practice of the process, a continuous two-stage treatment of the sulfur with hot water. Instead of the two stages a single stage treatment can be used, or alternatively, more than two stages can be employed. The number of stages used will depend on the quality of the sulfur subjected to treatment, the desired purity, and the desired capacity of the purification installation.

In the drawing, 10 and 11 are reactors in which the treatment of the sulfur with hot water is conducted. Each reactor is equipped with a motor driven agitator 12 and has at its top a hot water inlet 13 supplied with hot water from heater 15 through which pump 14 pumps water to be heated. The top of each reactor is provided with a vent line 16 leading from the vapor space 16'. The emitted vapors flow through line 16 into decanter 18.

Reactor 10 is provided at its base with a sulfur inlet line 21 through which pump 22 pumps molten crude sulfur from any suitable supply source into reactor 10. From reactor 10 a discharge line 23 leads into the base of the reactor 11. Each of the reactors 10 and 11 is equipped with suitable heating means, such as jackets or internal heating coils, not shown. The contents of both reactors are maintained under pressure generated by feeding the hot water and molten sulfur thereinto under the desired pressure conditions which, as noted, should be at least about 15 p.s.i.g., and controlling the escape of vapors from the tanks by the pressure-controlling valve 27, hereinafter described, to maintain the desired pressure conditions therein.

The upper portion of reactor 11 communicates through line 24 with decanter 18. Line 26 for discharge of aqueous phase and vented gas from the sulfur separator has the pressure-controlling valve 27 therein and leads from the upper portion of separator 18 to condenser 28 having a liquid seal 28' at its base. This seal is provided with a discharge line 29 for the removal of the water condensate mixture.

A line 31 leads from the base of the decanter 18 for discharge of the molten sulfur therefrom. Line 31 has a pressure reducing and decanter interface level controlling valve 32 therein. Line 34 leads from the low pressure side of valve 32 into the top of a jacketed stripping column 35, desirably of the packed type. In this column the molten sulfur flows downwardly countercurrent to rising vapors of residual moisture, chlorides and organics including carbon bisulfide released from the sulfur upon reduction of the pressure thereon and inert hot stripping gas, preferably steam, introduced at the base of the column through line 36. Vapor line 37 leads from the upper portion of stripping column 35 to base of condenser 28, desirably of the direct water spray type. In this condenser, the vapors and gases from column 35 and the vent gases including vapors from decanter 18 flow upwardly in direct contact with water sprayed at spaced points 38 into condenser 28. The mixture of water, condensate, including carbon bisulfide thus produced, and aqueous liquid from decanter 18 flow into liquid seal 28' from which they are discharged through line 29. Non-condensables are discharged through vent line 43.

The purified sulfur from stripping column 35 is discharged through line 39 into the sulfur storage pit 41 equipped with a suitable pump 45 for discharging the sulfur to any desired point, such, for example, as the carbon bisulfide production equipment. Pump 45 also circulates the sulfur through heating coils 44 to maintain the sulfur in molten condition.

It will be appreciated that the showing of the drawings is diagrammatic in character and that some flow control valves, meters, and temperature and pressure indicators and controllers have been omitted chiefly for the sake of clarity of illustration. The equipment is built of corrosion-resistant materials or lined with corrosion-resistant materials.

The following examples are given for illustrative purposes. It will be understood that the invention is not limited to these examples.

EXAMPLE I

This example is carried out in equipment such as shown in the drawing involving two-stage treatment of the sulfur with hot water under super-atmospheric pressure conditions with each reactor having a capacity of about 230 gallons. In this example the flow is continuous; all values are given in pounds per hour.

10,170 pounds of sulfur at about 220° C. containing 50 p.p.m. of iron, 0.1% carbon bissulfide, 0.4% organic chlorides and 2.0% sulfur chloride, calculated as sulfur monochloride, are fed to the first of the two reactors. 2,680 pounds of water at 120° C. are also fed to this reactor. Both the sulfur and water are under pressures of just above 40 p.s.i.g. The contents of the reacter are agitated while maintaining the pressure at about 40 p.s.i.g. The residence time within the reactor is about 13 minutes. The water reacts with the sulfur chloride forming HCl, which dissolves in the water. Gaseous products (chiefly $SO_2$) are thus produced along with sulfur, some of which dissolves in the washed sulfur. The reaction is exothermic; this factor and the cooling of the hot sulfur results in vaporization of some water with the production of steam. The steam vapors rise through the body of reaction mixture and these vapors plus the gaseous products formed partially strip carbon bisulfide and organic chlorides from the sulfur. The acidified water extracts iron compounds from the sulfur. The gaseous products thus produced including stripped organics pass from the reactor into the vent system.

The sulfur and water mixture pass continuously from the first reactor into the second. The sulfur introduced into the second reactor contains about 0.056% sulfur monochloride. 66 pounds of hot water under pressure of just above 40 p.s.i.g. are added to the second reactor. The temperature of the water is about 120° C. Further extraction, reaction and stripping occur similar to that which takes place in the first reactor. Generally, about 90% to 95% of the reaction takes place in the first reactor and the remainder in the second reactor. The sulfur-water mixture from the second reactor passes continuously into the decanter. Here the mixture separates into an upper aqueous phase and a lower molten sulfur phase. The decanter vapor space receives the vent gases via a common header from the vapor spaces of the two reactors. The agueous phase along with vent gases are continuously withdrawn, passed through a pressure reducing valve into a water condenser where all condensable gaseous products, including carbon bisulfide, are condensed, and the mixture of condensate and water withdrawn through the liquid seal 28'. The molten sulfur phase is separately withdrawn continuously, passed through a pressure reducing valve and introduced into the top of the stripping column. Vaporizable impurities, including carbon bisulfide, in the sulfur vaporize at the atmospheric pressure conditions maintained in this column. The sulfur after reduction of the pressure, i.e., flashing off of vaporizable impurities, consists of about 10,035 pounds at 140° C. and contains less than 5 p.p.m. iron from 0% to 0.02% carbon bisulfide, less than 0.01% organic chlorides, traces of water and about 0.0025% sulfur monochloride. As this sulfur pases down the packed stripping column, 600 pounds of steam entering the bottom of the column pass up through the sulfur, stripping the remaining chloride and organic impurities. The purified sulfur is withdrawn as product from the bottom of this column.

EXAMPLE II

This example differs from Example I chiefly in that it involves a single-stage treatment of the sulfur introduced at a temperature of about 220° C. into the reactor where the molten sulfur is mixed with hot water at a temperature of about 120° C., the mixture being maintained under a super-atmospheric pressure of 40 p.s.i.g. for a resistence time of about one hour, and the resultant mixture of molten sulfur and water continuously removed and passed directly to the decanter where stratification takes place into the upper or aqueous layer and vent gases and a lower molten sulfur layer. The treatment of the respective layers is substantially the same as in the case of these layers in Example I. Following such procedure there is obtained as bottoms product from the stripper a purified sulfur containing less than 10 p.p.m. of iron and about 0.02% of chlorides calculated as sulfur monochloride.

It will be noted that the present invention provides a process of purifying sulfur containing iron and chloride impurities to effect the removal of the bulk of such impurities at least to the extent of producing a purified sulfur satisfactory for feed to the carbon bisulfide production equipment or wherever a relatively pure sulfur is required. The preferred embodiment of this invention involves a continuous process for the treatment of sulfur containing from 20 to 100 p.p.m. of iron, from a trace to 0.2% carbon bisulfide, from 0.1% to 2% of organic chlorides, and from 1% to 4% of sulfur chlorides calculated as sulfur monochlorides, producing a purified sulfur containing not more than 5 p.p.m. of iron, from a trace to 0.008% carbon bisulfide, not more than 0.02% organic chlorides and from a trace to 0.03% sulfur chlorides calculated as sulfur monochloride, which purified sulfur when used in the carbon bisulfide prorduction equipment, results in a marked minimization of corrosion and fouling of such eqiupment. The herein disclosed process is free of explosion hazards due to possible formation of explosive gaseous mixtures containing carbon bisulfide. The handling of the purified sulfur product, containing as it does from a trace to 0.008% carbon bisulfide, in carbon bisulfide production equipment is also free of such explosion hazards.

Since certain changes can be made in carrying out the above sulfur purification method without departing from the scope of the invention, it is intended that all matter contained in the above description or shown in the accompanying drawing shall be interpreted as illustrative and not in a limiting sense.

What is claimed is:

1. The process of purifying sulfur containing iron and sulfur chloride impurities which comprises, contacting the crude sulfur in the liquid phase with water and maintaining the molten sulfur and water in intimate contact with each other at a temperature of at least about 120° C. and under a superatmospheric pressure of at least about 15 p.s.i.g. for a contact time sufficient for the water to react with chlorides to produce hydrochloric acid and for the hydrochloric acid to disssolve iron impurities, separating the water containing dissolved impurities from the molten sulfur and releasing the pressure on the molten sulfur and releasing the pressure on the molten sulfur to flash-off residual water and volatile impurities.

2. The process as defined in claim 1 in which the molten sulfur after separation from the water and release of the pressure thereon is subjected to stripping with an inert gas.

3. The process as defined in claim 1 in which the sulfur and the water are mixed in the proportions of from ⅛ to 6 volumes of sulfur per volume of water.

4. The continuous process of purifying sulfur containing iron, carbon bisulfide and sulfur chloride impurities, which process comprises continuously feeding into a reaction zone crude liquid sulfur and water in proportions sufficient for the water to form a distinct separate phase when the mixture is permitted to stratify, maintaining the mixture of water and liquid sulfur in intimate contact with each other in said reaction zone for a residence time of at least 40 seconds, at a temperature of at least about 120° C. and under a superatmospheric pressure of at least about 15 p.s.i.g., to produce a sulfur phase and an aqueous phase, continuously removing the sulfur phase, continuously removing the aqueous phase, and continuously reducing the pressure on the sulfur phase to approximately atmospheric pressure thus flashing-off water vapor and volatile impurities.

5. The process as defined in claim 4 in which the sulfur removed is subjected to stripping with an inert gas at a temperature of from125° C. to 150° C. and under approximately atmospheric pressure conditions.

6. The process as defined in claim 4 in which the mixing of the sulfur and water is conducted in a plurality of stages each at a temperature of from 125° C. to 145° C. under a pressure of from 25 p.s.i.g. to 45 p.s.i.g.

7. The continuous process of purifying sulfur containing from 20 to 100 p.p.m. of iron, from a trace to 1.5% carbon bisulfide, from 0.1% to 2% organic chlorides and from 1% to 4% sulfur chlorides calculated as sulfur monochloride, which process comprises:

(step 1) continuously feeding molten sulfur and hot water in proportions of from ⅛ to 6 volumes of sulfur per volume of water into a first reaction zone to form a body of mixture with a vapor space thereabove in said zone in which the mixture is subjected to agitation and maintaining said mixture in said first reaction zone for a residence time of at least 2 minutes at a temperature of at least about 125° C. and under a super-atmospheric pressure of at least 25 p.s.i.g.;

(step 2) continuously feeding the mixture from the first reaction zone into a second reaction zone to form a body of mixture in said second reaction zone with a vapor space thereabove and maintaining said mixture in said second reaction zone for a residence time of at least 2 minutes at a temperature of at least about 125° C. and under a super-atmospheric pressure of at least about 25 p.s.i.g.;

(step 3) continuously feeding the mixture from said second reaction zone into a stratification zone where the mixture stratifies into an upper aqueous layer and a lower molten sulfur layer;

(step 4) continuously collecting the emitted gases from the vapor spaces from the first and second reaction zones and feeding the collected gases to a vapor space above said stratification zone;

(step 5) continuously removing the aqueous material and emitted gases from said stratification zone and separately, continuously removing the molten sulfur;

(step 6) continuously feeding the molten sulfur through a pressure reducing valve where the pressure thereon is reduced to atmospheric pressure and introducing the molten sulfur at approximately atmospheric pressure into the upper portion of a stripping column maintained at a bottoms temperature of from 125° C. to 150° C. while passing an inert gas upwardly countercurrent to the down flowing molten sulfur thus stripping from the molten sulfur residual water and volatile impurities under the conditions of the stripping; and (step 7) continuously removing the purified molten sulfur as bottoms product from said stripping zone.

8. The process as defined in claim 7 in which the mixture of molten sulfur and water is maintained in each of the first two zones at a temperature of from 125° C. to 145° C. under a super-atmospheric pressure of from 25 p.s.i.g. to 45 p.s.i.g. for a residence time of from 10 to 25 minutes.

References Cited by the Examiner

UNITED STATES PATENTS

| 1,586,539 | 6/1926 | Thornton | 23—308 |
| 2,336,688 | 12/1943 | Jones et al. | 23—224 |

FOREIGN PATENTS

| 350,574 | 6/1931 | Great Britain. |

OSCAR R. VERTIZ, *Primary Examiner.*

MAURICE A. BRINDISI, *Examiner.*

H. S. MILLER, A. J. GRIEF, *Assistant Examiners.*